United States Patent
Punjani et al.

(10) Patent No.: US 10,491,507 B2
(45) Date of Patent: Nov. 26, 2019

(54) TRAFFIC MANAGEMENT SYSTEM

(71) Applicant: Cisco Technology, Inc., San Jose, CA (US)

(72) Inventors: Megha Punjani, Sunnyvale, CA (US); Maheshwari Dixith, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 415 days.

(21) Appl. No.: 15/055,597

(22) Filed: Feb. 28, 2016

(65) Prior Publication Data

US 2017/0250896 A1    Aug. 31, 2017

(51) Int. Cl.

| | | |
|---|---|---|
| G01C 21/26 | (2006.01) | |
| G01C 21/34 | (2006.01) | |
| G08G 1/0968 | (2006.01) | |
| H04L 12/727 | (2013.01) | |

(52) U.S. Cl.
CPC .................. *H04L 45/121* (2013.01)

(58) Field of Classification Search
CPC .... G01C 21/26; G01C 21/34; G01C 21/3453; G01C 21/3484; G01C 21/3492; G08G 1/0145; G08G 1/096811
See application file for complete search history.

(56) References Cited

U.S. PATENT DOCUMENTS

| | | |
|---|---|---|
| 8,024,111 B1 | 9/2011 | Meadows et al. |
| 8,406,998 B2 | 3/2013 | Shaffer et al. |
| 8,412,445 B2 | 4/2013 | Uyeki |
| 9,322,661 B2 * | 4/2016 | Wechsler ............. G08G 1/0145 |
| 2007/0290839 A1 * | 12/2007 | Uyeki ................ G01C 21/3415 340/539.13 |

(Continued)

FOREIGN PATENT DOCUMENTS

| | | |
|---|---|---|
| CN | 103268701 B | 2/2015 |
| CN | 104575074 A | 4/2015 |

OTHER PUBLICATIONS

Cisco, How Does Load Balancing Work? (Jan. 8, 2015) Can be seen at: http://www.cisco.com/c/en/us/support/docs/ip/border-gateway-protocol-bgp/5212-46.html.

(Continued)

*Primary Examiner* — Scott M Sciacca
(74) *Attorney, Agent, or Firm* — Behmke Innovation Group LLC; James Behmke; Stephen D. LeBarron

(57) ABSTRACT

In one embodiment, a traffic management system includes an input/output sub-system to receive route search requests from client devices, and a CPU to search a route database for a suitable match for the route search requests yielding routes. The input/output sub-system is operative to receive data related to traffic levels along the routes. The CPU is operative to calculate a score for each route, select N quickest routes, and allocate the N quickest routes among the client devices. A first and second client device are allocated a first and second quickest route from the N quickest routes, respectively, the first and second quickest route having a first and second score, respectively. The second score is different to the first score. The input/output sub-system is operative to send to each client device data about the route allocated to that client device. Related apparatus and methods are also described.

20 Claims, 3 Drawing Sheets

(56) References Cited

U.S. PATENT DOCUMENTS

2008/0262716 A1* 10/2008 Li .......................... G08G 1/01
                                                          701/533
2009/0070024 A1    3/2009 Burchard et al.
2017/0059342 A1*  3/2017 Rajendran ............. H04W 24/02
2017/0358025 A1* 12/2017 Varma ................... G06Q 30/08

OTHER PUBLICATIONS

Google, Official Google Blog: The Bright Side of Sitting in Traffic: Crowdsourcing Road Congestion Data (Aug. 25, 2009) Can be seen at: https://googleblog.blogspot.in/2009/08/bright-side-of-sitting-in-traffic.html.

* cited by examiner

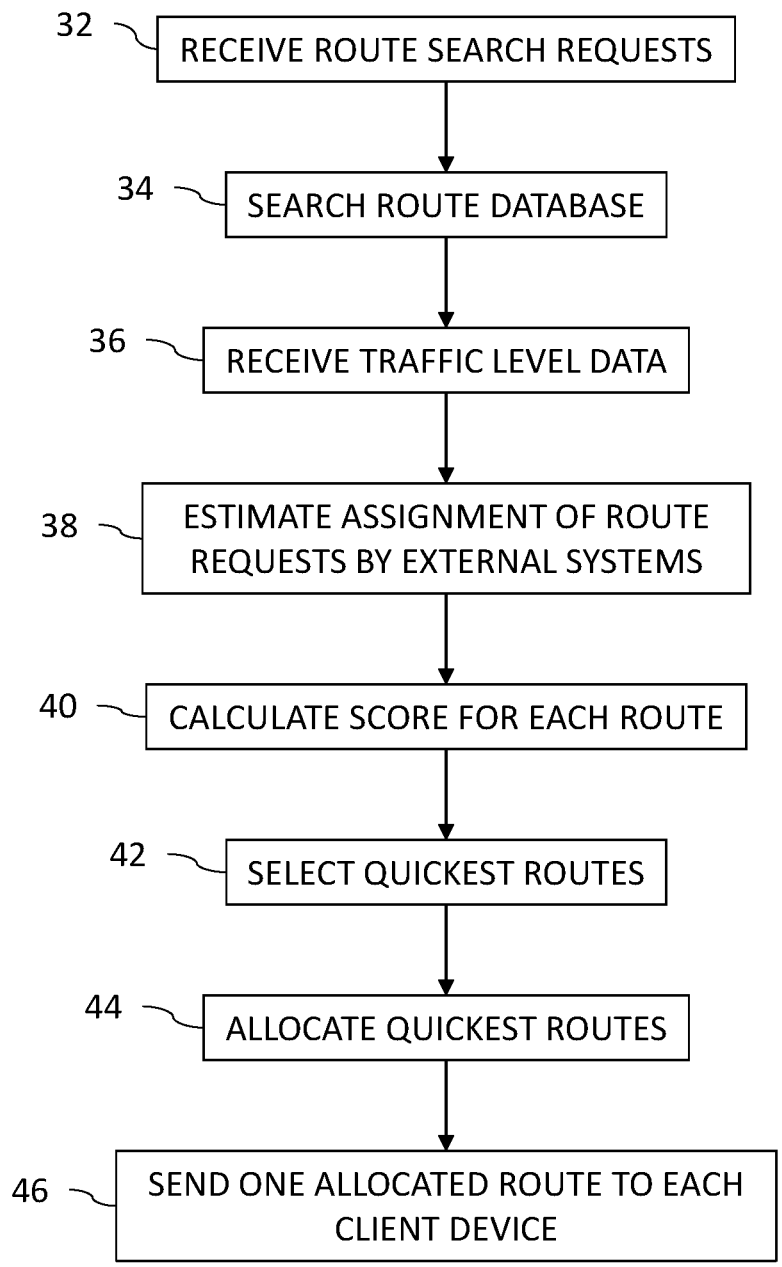

US 10,491,507 B2

TRAFFIC MANAGEMENT SYSTEM

TECHNICAL FIELD

The present disclosure generally relates to traffic management.

BACKGROUND

By way of introduction, route planning systems typically determine possible routes based on shortest distance and/or shortest journey time from an origin to a destination. The route planning may take into account various historical traffic patterns and/or current traffic levels along the routes being considered. The route with the shortest distance and/or shortest journey time may be sent to the client device for use in navigating that route. Alternatively, a plurality of different route options may be presented to a client device for selection by a user.

BRIEF DESCRIPTION OF THE DRAWINGS

The present disclosure will be understood and appreciated more fully from the following detailed description, taken in conjunction with the drawings in which:

FIG. 4 is a view of a flow chart showing exemplary steps in a method of operation of the traffic management system of FIG. 1.

DESCRIPTION OF EXAMPLE EMBODIMENTS

Overview

There is provided in accordance with an embodiment of the present disclosure a traffic management system including an input/output sub-system to receive a plurality of route search requests from a plurality of client devices, and a central processing unit to search a route database for a suitable match for the plurality of route search requests yielding a plurality of routes. The input/output sub-system is operative to receive data related to traffic levels along the plurality of routes. The central processing unit is operative to calculate a score for each one route of the plurality of routes, the score representing an estimated journey time along the one route based on the data related to traffic levels along the one route. The central processing unit is also operative to select N quickest routes from the plurality of routes based on the score of each one route of the plurality of routes and allocate the N quickest routes among the plurality of client devices. Only one quickest route of the N quickest routes is allocated to each one of the plurality of client devices. A first client device of the plurality of client devices is allocated a first quickest route from the N quickest routes. The first quickest route has a first score. A second client device of the plurality of client devices is allocated a second quickest route from the N quickest routes. The second quickest route has a second score which is different to the first score. The input/output sub-system is further operative to send to each one client device of the plurality of client devices data about the one quickest route allocated to the one client device.

DETAILED DESCRIPTION

Figure 1:
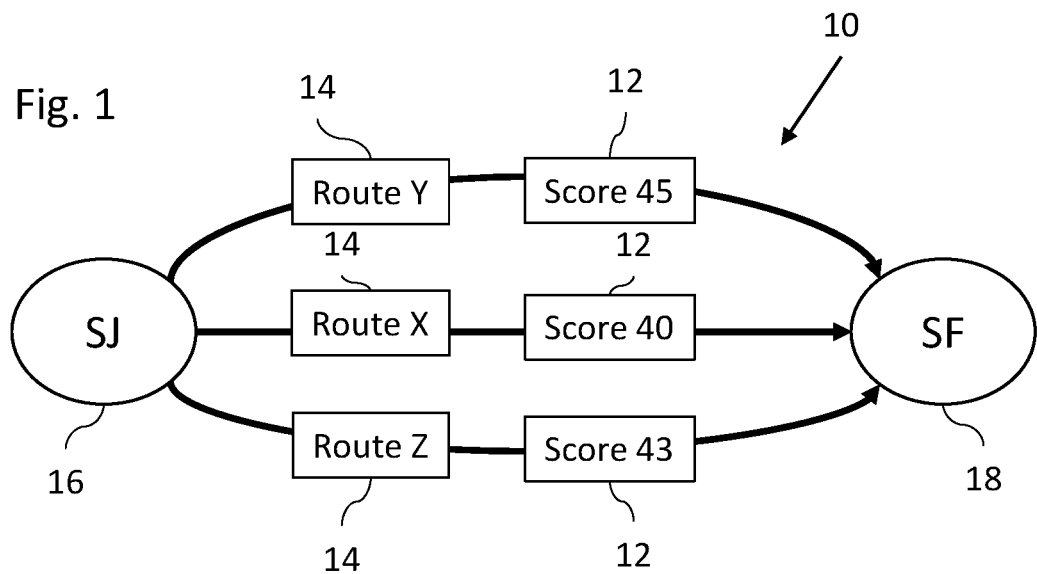
FIG. 1 is a block diagram view of route planning by a traffic management system constructed and operative in accordance with an embodiment of the present disclosure.

Reference is now made to FIG. 1, which is a block diagram view of route planning by a traffic management system 10 constructed and operative in accordance with an embodiment of the present disclosure. The traffic management system 10 includes route planning functionality, but has been described as a traffic management system as the route planning of the system 10 also manages traffic as will be described in more detail below. Consider for example, that the traffic management system 10 receives route search requests from multiple client devices (not shown) requesting route planning from an origin 16, San Jose (SJ), to a destination 18, San Francisco (SF). The traffic management system 10 may calculate a score 12 for each of a plurality of different routes 14 (only three of the quickest routes are shown in FIG. 1) based on various factors including one or more of the following: historical data of traffic levels on the routes 14, local events, holidays and current traffic levels along the different routes 14. The score 12 will now be referred to throughout as score (reference numeral or r.n. 12) to prevent confusion with a score having a value equal to 12. The current traffic levels along the different routes 14 may be estimated from location and speed data received from the client devices which are subscribed to the traffic management system 10 and in vehicles travelling along the routes 14 as well as from the client devices which are subscribed to other systems and in vehicles travelling along the routes 14 as well as other road travelers who are not using any route planning system. As the location and speed data from the client devices which are subscribed to other systems, and in vehicles travelling along the routes 14, is generally not publically available, the traffic management system 10 may estimate the location and speed data from the client devices which are subscribed to other systems based on the location and speed data from the client devices which are subscribed to the traffic management system 10 and extrapolate using the market share of subscribers subscribed to other systems (or the market share of the traffic management system 10) assuming that the subscribers to the traffic management system 10 are representative of the general population of subscribers to route planning systems. So for example, if there are 1000 client devices reporting data from route X to the traffic management system 10 and the subscribers to the traffic management system 10 represent 20% of the market share, then it may be assumed that there are 5000 client devices currently on route X travelling at the speed reported by the 1000 client devices. For more accurate results the market share may be considered on a region, state, county or city basis, by way of example only. Similarly, the location and speed data of other road travelers who are not using any route planning system may also be estimated based on available statistics, for example, but not limited to, based on the location and speed data from the client devices which are subscribed to the traffic management system 10 and extrapolating using the market share of road travelers who are not using any route planning system.

FIG. 1 shows three routes 14 and a score (r.n. 12) associated with each route 14. Route Y has a score of 45, route X has a score of 40 and route Z has a score of 43. There may be other routes 14 which are not shown in FIG. 1.

The scores (r.n. 12) associated with routes 14 shown in FIG. 1 represent some of the quickest journey times from SJ to SF. In the example of FIG. 1, the lowest score is associated with the quickest route 14 and the score (r.n. 12) may correspond to the estimated journey time in minutes. However, in other embodiments the score (r.n. 12) may simply be a score based on various factors with the lowest score representing the quickest journey time.

As mentioned above, route X represents the quickest route 14 of the routes 14. If all route search requests for a route from SJ to SF are directed along route X, then route X may quickly become congested with traffic. In accordance with an embodiment of the present disclosure, the client devices that requested route search requests from SJ to SF are allocated routes from among routes X, Y and Z in order to reduce future congestion. The allocation of routes X, Y and Z among the requesting client devices may be divided inversely proportional to the scores (r.n. 12) associated with routes X, Y and Z, by way of example only. Alternatively, the allocation of routes X, Y and Z among the requesting client devices may be divided equally among the routes X, Y and Z, by way of example only.

It will be appreciated that the score (r.n. 12) may also be calculated such that the highest score of the scores (r.n. 12) represents the quickest time. For example, a score of 100 may represent the quickest time and a score of 1 the slowest time and all other scores are normalized between 1 and 100 based on the quickest and slowest journey time. In such a case, the allocation of routes X, Y and Z among the requesting client devices may be divided equally among the routes X, Y and Z or may be divided proportionally to the scores associated with routes X, Y and Z, by way of example only.

As described above, there may be other routes which are not shown in FIG. 1 and the routes 14 shown in FIG. 1 represent the quickest journey times from SJ to SF. The routes 14 shown in FIG. 1 are also the routes 14 allocated to the requesting client devices. The decision as to which routes of the routes 14 should be included in the routes allocated among the client devices may follow any suitable criteria, for example, but not limited to, select N quickest routes from the available routes or select the routes with a score within a predetermined percentage of the score of the quickest route. So in the example of FIG. 1, routes Y and Z have a score which is within 13% of the score of route X and based on that criteria routes Y and Z are considered in the list of routes which are allocated.

The traffic management system 10 may use any routes from the origin 16 to the destination 18. However, calculating scores (r.n. 12) for all the possible different permutations and combinations of routes may be too computational intensive for the traffic management system 10. Therefore, the traffic management system 10 may restrict calculating scores (r.n. 12) for routes which are known to generally be quick routes based on previous calculations or to use routes which are known routes (e.g. using highways or similar where possible).

It will be appreciated that the scores (r.n. 12) for the routes 14 are generally not recalculated for every incoming route search request even if new traffic data is received. The scores (r.n. 12) may be recalculated periodically: for example, every fixed time period, e.g., every 5 minutes; according to a time period which changes according to the time of day, e.g., every 2 minutes in rush hour and every 5 minutes at other times; or in accordance with the percentage change in route journey times, so for example, if the most recent scores (r.n. 12) calculated by the traffic management system 10 have changed by more than X percent, then the gap until the next recalculation may be X percent shorter than the previous gap and vice-versa.

It will be appreciated that routes 14 allocated among the requesting client devices are allocated over a period of time and not all at exactly the same time. For example, routes may be allocated to different requesting client devices over a 5 minute period. The allocation may be equally divided, proportion or inversely proportional as described above. If the scores (r.n. 12) for the routes 14 change then the allocation of the routes 14 may change as well. The allocation may be cumulative such that even if new scores (r.n. 12) are calculated, the previous allocations are considered when routes 14 are allocated to additional client devices. The calculation may only consider cumulative allocations for allocations made in a particular previous time period, for example, but not limited to, 5, 10 or 15 minutes. Alternatively, once new scores (r.n. 12) are calculated for routes 14, allocation of routes 14 prior to the new scores (r.n. 12) being calculated are not considered when deciding on how to allocate the routes 14 to client devices.

The example given in FIG. 1 has assumed that the subscribers are all travelling from the same origin 16 to the same destination 18. However, in reality most subscribers may not be travelling from exactly the same origin 16 to the same destination 18 even though a major part of the route could be the same. For example, a person may be travelling from San Rafael to Los Gatos. The journey may be via routes from SJ to SF or the journey may be via one or more other routes, for example, via Richmond, Oakland and Fremont. The traffic management system 10 may consider different total routes and then from the N quickest total routes, select whether the route will be via SJ to SF or via Richmond, Oakland and Fremont. If the SJ to SF route is selected, the requesting device will be allocated one of the routes X, Y or Z according to the allocation algorithm described above. Similarly, if a different sub-route is selected that route may also be allocated according to the allocation algorithm described above. The selection between the SF to SJ sub-route and the Richmond, Oakland and Fremont sub-route may be similarly allocated according to the allocation algorithm mentioned above. The allocation algorithm may be applied to all sub-routes or only to certain sub-routes, for example, but not limited to, sub-routes where traffic congestion is known. Additionally, the allocation algorithm may be applied to certain routes at certain times, for example, but not limited to, at times when traffic congestion is known, such as rush-hour periods and special events. Traffic congestion may be defined using any suitable definition, for example, but not limited to, when the average speed of vehicles is less than a certain fraction of the speed limit along the route 14 or when the number of client devices in vehicles along the route 14 exceeds a predefined limit for the route 14. The term "route" as used in the specification and claims is defined to include a sub-route of a total route or a total route.

Figure 2:
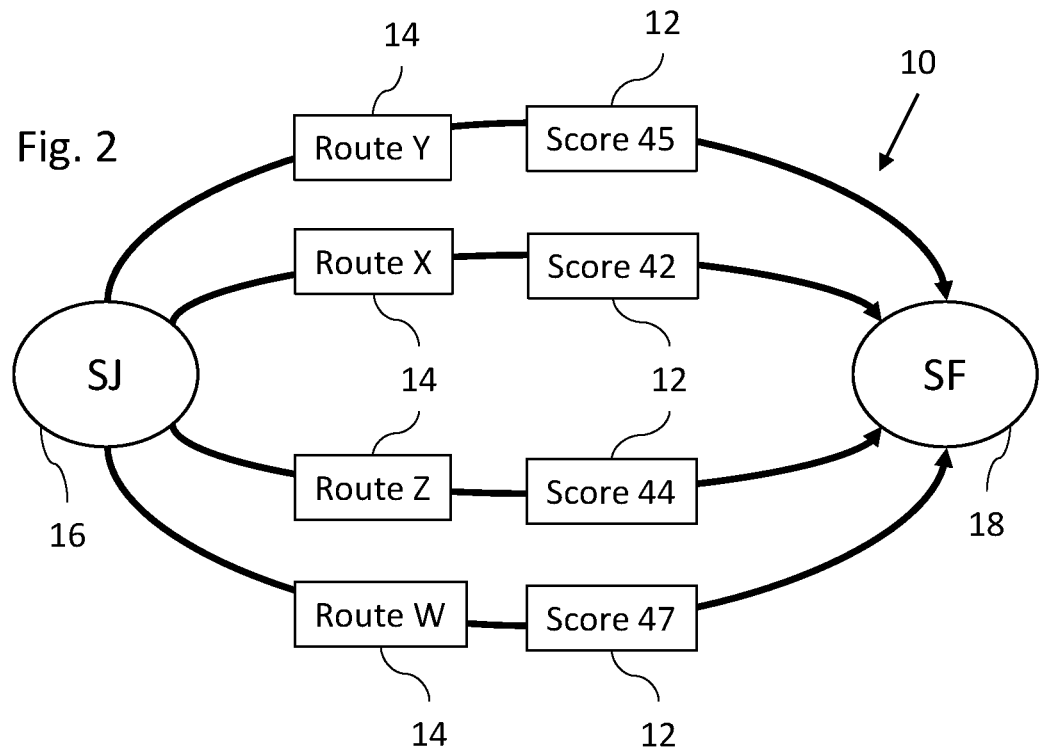
FIG. 2 is a block diagram view of route planning by the traffic management system of FIG. 1 based on additional traffic management input.

Reference is now made to FIG. 2, which is a block diagram view of route planning by the traffic management system 10 based on additional traffic management input. The scores (r.n. 12) calculated for the different routes 14 may be enhanced by also taking into account incoming route search requests and how the different routes 14 are currently being assigned to the client devices. The route allocations will lead to additional traffic on the routes 14 and it is therefore prudent to include this data when calculating the scores (r.n. 12).

Additionally, it may be assumed that other route planning systems will also be assigning routes 14 to client devices and that may also be taken into account by extrapolating the incoming route search requests to the traffic management system 10 based on market share of the traffic management system 10 or the other systems as described above with reference to FIG. 1. For the other route planning systems, it may be assumed that the quickest routes 14 are being assigned to client devices unless it is known otherwise.

Using the additional data of incoming route search requests, FIG. 2 shows that the scores (r.n. 12) for routes X and Z have changed to 42 and 44, respectively. As the score (r.n. 12) for route X has increased to 42, another route 14, route W may now be considered for allocation to the client devices as the score (r.n. 12) for route W is equal to 47 which is within 13% of the score (r.n. 12) of route X. It will be appreciated that the amount of 13% is brought by way of example only and that any suitable percentage or other method may be used to determine which route 14 to consider in the allocation to the client devices.

The change in the scores (r.n. 12) may also change the proportion of the routes 14 allocated to the different client devices as described above. Additionally, using the additional traffic data based on incoming route request searches and how the route requests are allocated to the routes 14, another route 14, namely route W, has been brought into the allocation of routes 14 and therefore the traffic is now allocated over more routes by the traffic management system 10 thereby further reducing traffic congestion along the routes 14.

Figure 3:
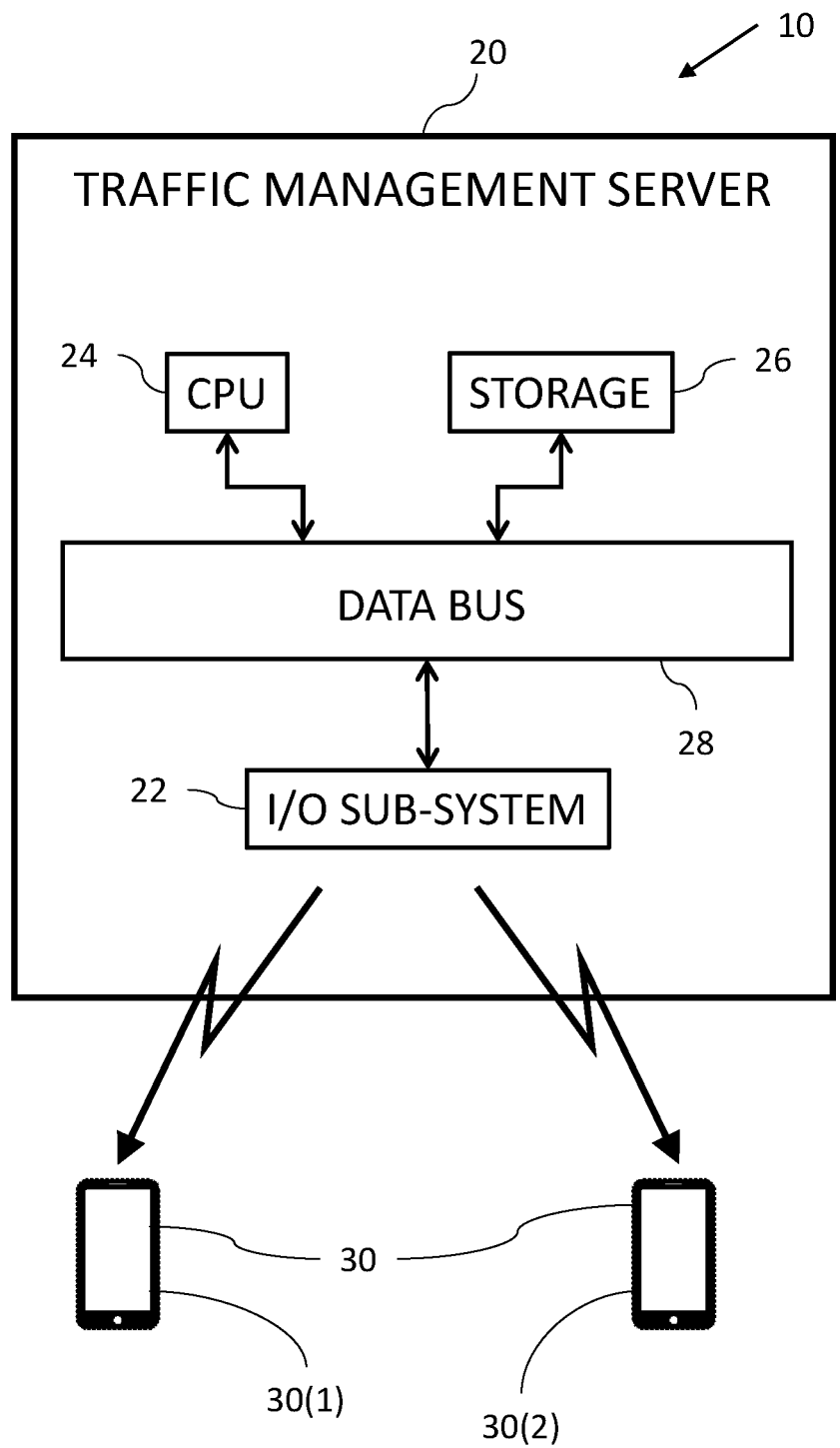
FIG. 3 is a block diagram view of a traffic management server in the traffic management system of FIG. 1.

Reference is now made to FIG. 3, which is a block diagram view of a traffic management server 20 in the traffic management system 10 of FIG. 1. The traffic management server 20 includes an input/output sub-system 22, a central processing unit (CPU) 24, a storage medium 26 and a data bus 28. The input/output sub-system 22 is operative to transfer data to and from a plurality of client devices 30 (only two shown for the sake of simplicity) described in more detail with reference to FIG. 4. The storage medium 26 is operative to store data used by the CPU 24 including data about the routes 14 (FIG. 1), saved scores (r.n. 12) (FIG. 1) and previous allocations of the routes 14 to the client devices 30, by way of example only. The data bus 28 is operative to enable the transfer of data between the different elements of the traffic management server 20.

Reference is now made to FIG. 4, which is a view of a flow chart showing exemplary steps in a method of operation of the traffic management system 10 of FIG. 1. Reference is also made to FIG. 3. The input/output sub-system 22 is operative to receive a plurality of route search requests from the client devices 30 (block 32). The CPU 24 is operative to search a route database (not shown), optionally maintained in the storage medium 26, for a suitable match for the route search requests yielding a group of the routes 14 (FIG. 1) (block 34). The input/output sub-system 22 is operative to receive data related to traffic levels along the group of the routes 14 (block 36). It will be appreciated that the route search request may be broken down into a plurality of sub-routes as discussed in more detail above with reference to FIG. 1. The CPU 24 is operative to estimate the assignment of the incoming route search requests received by one or more systems external to the routing planning system 10 based on a number of incoming route search requests received by the input/output sub-system 22 and extrapolating using market share data as described in more detail above with reference to FIG. 1 (block 38). Similarly, location and speed data of other road travelers who are not using any route planning system may also be estimated based on available statistics.

The CPU 24 is operative to calculate the score (r.n. 12) (FIG. 1) for each route 14 (FIG. 1). The CPU 24 is operative to calculate the score (r.n. 12) for each route 14 in the group of routes 14 based on the data related to traffic levels along the respective routes 14, optionally based on incoming route search requests and how the incoming route search requests are allocated (i.e., the allocation of incoming route search requests among the routes 14 by the CPU 24) and optionally based on the estimate of assignment of incoming route search requests, received by one or more systems external to the traffic management system 10, among the routes 14 as described in more detail above with reference to FIG. 1 as well as based on the estimate of location and speed data of other road travelers who are not using any route planning system. The score (r.n. 12) for one of the routes 14 in the group of routes 14 represents an estimated journey time along that route 14 based on the traffic levels (block 40) and optionally the other factors mentioned above.

The CPU 24 is operative to select N quickest routes from the group of routes 14 (FIG. 1) based on the score (r.n. 12) (FIG. 1) of each of the routes 14 in the group of routes 14 (block 42). In particular, the CPU 24 is operative to select the N quickest routes from the group of routes 14 by selecting routes from the group of routes 14 having a score (r.n. 12) within a predetermined measure from the score (r.n. 12) of the route 14 having a shortest estimated journey time along that route 14 as described in more detail above with reference to FIG. 1.

The CPU 24 is operative to allocate the N quickest routes (FIG. 1) among the client devices 30 (block 44). Only one quickest route 14 of the N quickest routes is generally allocated to each client device 30. Each client device 30 typically does not receive a choice of routes 14 from which to select.

Referring again to FIG. 3, the allocation may be illustrated by way of two of the client devices 30, a client device 30(1) and a client device 30(2). The client device 30(1) is allocated a first quickest route from the N quickest routes. The first quickest route has a score A. The client device 30(2) is allocated a second quickest route from the N quickest routes. The second quickest route has a score B which is different to the score A. The first quickest route has the score A and the second quickest route has the score B are generally based on the same traffic input data as described above in more detail with reference to FIG. 1. The CPU 24 is operative to allocate the N quickest routes among the client devices 30 according to the score (r.n. 12) (FIG. 1) of each of the N quickest routes. The CPU 24 may be operative to allocate the N quickest routes among the plurality of client devices 30 in proportion to the score of each of the N quickest routes, inversely proportional to the score (r.n. 12) of each of the N quickest routes or equally among the client devices 30 as described above in more detail with reference to FIG. 1. Each of the N quickest routes is typically allocated to more than one client device.

The input/output sub-system 22 is operative, for each one of the client devices 30, to send to the client device 30 data about the quickest route allocated to that client device 30 (block 46). The quickest route 14 (FIG. 1) may be part of a total route such that the input/output sub-system 22 may be operative to send that client device 30 other quickest route information making up part of the total route 14.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A vehicle traffic management system comprising: an input/output subsystem to receive a plurality of route search requests from a plurality of client devices; and a central processing unit to search a route data base for a suitable match for the plurality of route search requests yielding a plurality of routes, wherein:
    the input/output sub-system is operative to receive data related to traffic levels along the plurality of routes;
    the central processing unit is operative to:
        calculate a score for each one route of the plurality of routes a given vehicle can take from an origin to a destination, the score representing an estimated journey time along the one route based on extrapolated vehicle traffic levels along the one route, the extrapolated vehicle traffic levels determined using at least (a) the data related to traffic levels along the plurality of routes and (b) statistics of the plurality of client devices, wherein the score for each route of the plurality of routes is periodically recalculated and a gap until the next recalculation is shortened when a most recent score has changed by more than a predetermined percentage;
        select N quickest routes from the plurality of routes based on the score of each one route of the plurality of routes; and
        allocate the N quickest routes among the plurality of client devices, wherein: only one quickest route of the N quickest routes is allocated to each one of the plurality of client devices; a first client device of the plurality of client devices is allocated a first quickest route from the N quickest routes, the first quickest route having a first score; and a second client device of the plurality of client devices is allocated a second quickest route from the N quickest routes, the second quickest route having a second score which is different to the first score; and
    the input/output sub-system is further operative to send to each one client device of the plurality of client devices data about the one quickest route allocated to the one client device.

2. The system according to claim 1, wherein the first quickest route having the first score and the second quickest route having the second score are based on the same traffic input data.

3. The system according to claim 1, wherein the central processing unit is operative to select the N quickest routes from the plurality of routes by selecting routes from the plurality of routes having a score within a predetermined measure from the score of one route of the plurality routes having a shortest estimated journey time along the one route.

4. The system according to claim 1, wherein the central processing unit is operative to allocate the N quickest routes among the plurality of client devices according to the score of each of the N quickest routes.

5. The system according to claim 4, wherein the central processing unit is operative to allocate the N quickest routes among the plurality of client devices in proportion to the score of each of the N quickest routes.

6. The system according to claim 4, wherein the central processing unit is operative to allocate the N quickest routes among the plurality of client devices inversely proportional to the score of each of the N quickest routes.

7. The system according to claim 1, wherein the central processing unit is operative to calculate the score for each one route of the plurality of routes based on the data related to traffic levels and incoming route search requests.

8. The system according to claim 1, wherein the central processing unit is operative to calculate a score for each one route of the plurality of routes based on the data related to traffic levels and allocation of incoming route search requests among the plurality of routes by the central processing unit.

9. The system according to claim 1, wherein the central processing unit is operative to calculate a score for each one route of the plurality of routes based on the data related to traffic levels and an estimate of assignment of incoming route search requests, received by one or more systems external to the traffic management system, among the plurality of routes.

10. The system according to claim 9, wherein central processing unit is operative to estimate the assignment of the incoming route search requests received by the one or more systems external to the routing planning system based on a number of incoming route search requests received by the input/output sub-system.

11. A vehicle traffic management method comprising:
    receiving a plurality of route search requests from a plurality of client devices;
    searching a route database for a suitable match for the plurality of route search requests yielding a plurality of routes a given vehicle can take from an origin to a destination;
    receiving data related to traffic levels along the plurality of routes;
    calculating a score for each one route of the plurality of routes, the score representing an estimated journey time along the one route based extrapolated vehicle traffic levels along the one route, the extrapolated vehicle traffic levels determined using at least (a) the data related to traffic levels along the plurality of routes and (b) statistics of the plurality of client devices, wherein the score for each route of the plurality of routes is periodically recalculated and a gap until the next recalculation is shortened when a most recent score has changed by more than a predetermined percentage;

selecting N quickest routes from the plurality of routes based on the score of each one route of the plurality of routes;

allocating the N quickest routes among the plurality of client devices, wherein: only one quickest route of the N quickest routes is allocated to each one of the plurality of client devices; a first client device of the plurality of client devices is allocated a first quickest route from the N quickest routes, the first quickest route having a first score; and a second client device of the plurality of client devices is allocated a second quickest route from the N quickest routes, the second quickest route having a second score which is different to the first score; and sending to each one client device of the plurality of client devices data about the one quickest route allocated to the one client device.

12. The method according to claim 11, wherein the first quickest route having the first score and the second quickest route having the second score are based on the same traffic input data.

13. The method according to claim 11, wherein the selecting the N quickest routes from the plurality of routes includes selecting routes from the plurality of routes having a score within a predetermined measure from the score of one route of the plurality routes having a shortest estimated journey time along the one route.

14. The method according to claim 11, wherein the allocating includes allocating the N quickest routes among the plurality of client devices according to the score of each of the N quickest routes.

15. The method according to claim 14, wherein the allocating includes allocating the N quickest routes among the plurality of client devices in proportion to the score of each of the N quickest routes.

16. The method according to claim 14, wherein the allocating includes allocating the N quickest routes among the plurality of client devices inversely proportional to the score of each of the N quickest routes.

17. The method according to claim 11, wherein the calculating includes calculating the score for each one route of the plurality of routes based on the data related to traffic levels and incoming route search requests.

18. The method according to claim 11, wherein the calculating includes calculating the score for each one route of the plurality of routes based on the data related to traffic levels and allocation of incoming route search requests among the plurality of routes.

19. The method according to claim 11, wherein: the traffic management method is implemented in a traffic management system; and the calculating includes calculating the score for each one route of the plurality of routes based on the data related to traffic levels and an estimate of assignment of incoming route search requests, received by one or more systems external to the traffic management system, among the plurality of routes.

20. The method according to claim 19, further comprising estimating the assignment of the incoming route search requests received by the one or more systems external to the routing planning system based on a number of incoming route search requests received by the routing planning system.

* * * * *